United States Patent
Akhteruzzaman

(10) Patent No.: US 6,212,275 B1
(45) Date of Patent: Apr. 3, 2001

(54) TELEPHONE WITH AUTOMATIC PAUSE RESPONSIVE, NOISE REDUCTION MUTING AND METHOD

(75) Inventor: Akhteruzzaman, Naperville, IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/108,155

(22) Filed: Jun. 30, 1998

(51) Int. Cl.[7] ..................................................... H04M 9/00
(52) U.S. Cl. ............................................. 379/421; 379/351
(58) Field of Search ..................................... 379/392, 202, 379/421, 350, 351; 381/94.5, 95; 704/270, 272

(56) References Cited

U.S. PATENT DOCUMENTS

| | | | |
|---|---|---|---|
| 2,878,314 | * 3/1959 | Laurence | 379/421 |
| 3,562,791 | * 2/1971 | Baker | 379/421 |
| 3,839,604 | * 10/1974 | Pardee | 379/421 |
| 3,928,733 | * 12/1975 | Hueber | 381/68.4 |
| 3,939,311 | * 2/1976 | Smith | 379/421 |
| 4,472,601 | * 9/1984 | Wilson | 379/351 |
| 4,536,616 | * 8/1985 | Kaire | 379/392 |
| 4,700,383 | * 10/1987 | Takagi et al. | 379/421 |
| 4,703,507 | * 10/1987 | Holden | 381/94.5 |
| 4,847,897 | * 7/1989 | Means | 379/390 |
| 5,384,842 | * 1/1995 | Tapping et al. | 379/387 |
| 5,533,133 | * 7/1996 | Lamkin et al. | 381/94.5 |
| 5,604,145 | * 2/1997 | Hannah et al. | 381/94.5 |
| 5,751,822 | * 5/1998 | Yamaguchi et al. | 381/94.1 |
| 5,784,457 | * 7/1998 | Haba | 379/421 |
| 5,982,880 | * 11/1999 | Kim | 379/388 |

* cited by examiner

Primary Examiner—Richemond Dorvil
(74) Attorney, Agent, or Firm—Carmen B. Patti; Wildman, Harrold, Allen & Dixon

(57) ABSTRACT

A telephone with an automatic muting circuit that mutes the microphone in response to detection of speaking pauses of the local user to reduce noise due to acoustical feedback that are detected by comparing the waveforms from the microphone and the audio speaker after being amplified by amplifiers with automatic gain control circuits to the same level with speech subtractor. During pauses when the signals compared are substantially the same, then automatic muting circuit is activated by the speech subtractor to mute the microphone but when the local user speaks into the microphone the subtraction of the waveforms does not yield a null result and the microphone is unmuted.

17 Claims, 1 Drawing Sheet

TELEPHONE WITH AUTOMATIC PAUSE RESPONSIVE, NOISE REDUCTION MUTING AND METHOD

BACKGROUND OF THE INVENTION

The present invention generally relates to a telephone and, more particularly, to long line telephonic noise reduction and to automatic muting apparatus and methods of muting.

A common problem with telephonic communication particularly during conference telephonic calls between multiple locations involving varied communication links, such as radio, communication satellite, under sea cable and local loops, is the generation of audible whistle type noise. This noise is generated most often when there are speaking pauses of the participants of the conference telephone call.

The present inventors have determined that this noise is caused at least in part by acoustical feedback from the telephone speaker to the telephone microphone. This feedback noise problem is particularly acute in the case of so-called speaker telephones, including those built in to desk top computers, video telephones and the like. This is believed by the inventors to be due to several factors. These factors includes the fact that the audio input to the speaker telephone must be of sufficient magnitude to drive a loud speaker that can be heard any where in a room. Also, microphones that are used in speaker telephones have sufficient sensitivity to enable good pickup of sounds anywhere within a room in which the speaker telephone is located while the microphone is acoustically less isolated than in the case of a telephone employing a handset.

Some speaker telephones operate on a simplex basis and automatically mute the speaker telephone microphone during such time speech or other sound above a preselected threshold magnitude is being substantially continuously received and converted to audible sound by the telephonic speaker. During this speaking time, the output signals from the speaker telephone microphone is switched out of circuit, and connection of microphonic output signals to the telephone line is prevented and the communication line is said to be "captured" by the incoming caller. The communication link then remains captured until there is a pause in speaking. Then, when there is a pause, the muting of the microphone is terminated, or unmuted. The microphone is said top be open or on. During the speaking pauses, any party to the conference is enabled to capture the one-way (at a time) communication link. When the local caller starts speaking when the microphone is on the local caller captures the line. Speaking of the local caller, in the case of the other speaker telephones also being simplex, will cause the microphones of the other speaker telephones to be muted until there are pauses in the speaking of the local caller.

Other speaker telephones operate on a duplex basis via a hybrid interface which enables simultaneous two-way conversation. In such duplex speaker telephones, there is no automatic muting of the microphone during speaking of the remote caller and the microphone remains on at all times unless manually turned of by the local caller.

SUMMARY OF THE INVENTION

In accordance with the present invention, the noise problems associated with telephones due to acoustical feedback noted above are overcome by automatically muting the microphone whenever the local caller, or user, pauses in speaking.

Preferably, in accordance with the invention a telephone having a microphone and an audio speaker is provided with an automatic muting circuit means for detecting pauses in speaking of a local user and means responsive to the detecting means for automatically muting the microphone. A signal comparator compares signals from the microphone and the audio speaker and is connected to the automatic muting circuit to actuate the automatic muting circuit if the signals from the microphone and the audio speaker have substantially the same waveform. The signal comparator is preferably a speech subtractor that subtracts one of the signals from the microphone and the speaker from another of the signals from the microphone and the speaker, and the detecting means includes a pair of amplifiers with automatic gain control to respectively amplify the signals from the microphone and the audio speaker to substantially the same level prior to subtraction by the speech subtractor. The microphone is automatically opened for transmission of microphonic output signals whenever a local user speaks into the microphone.

Thus, in accordance with the method of the invention the microphone is automatically muted by the steps of detecting pauses in speaking of a local user and then responding to the detection of the speaking pauses by automatically muting the microphone.

BRIEF DESCRIPTION OF THE DRAWING

The foregoing advantageous features will be described in detail and other advantageous features will be made apparent from the detailed description of the automatic muting circuit of the present invention that is given with reference to the drawing which is a functional block diagram of a telephone incorporating an automatic muting circuit of the invention.

DETAILED DESCRIPTION

Figure 1:
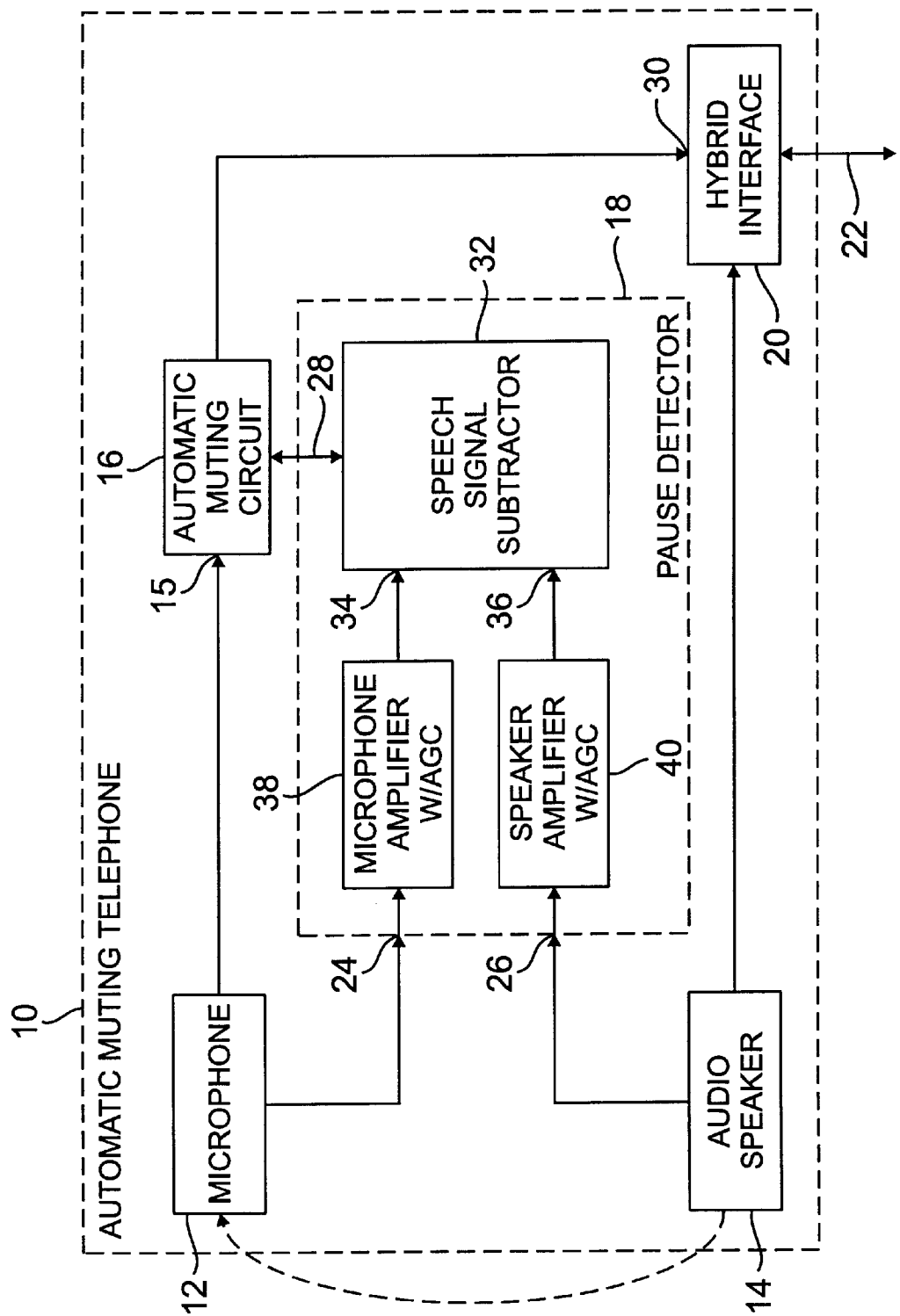

Referring to the drawing, the an automatic muting telephone 10 constructed in accordance with the present invention has a microphone 12, an audio speaker 14, an automatic muting circuit 16, a pause detector 18 and a hybrid interface 20 connected with a telephone line 22. The pause detector 18 receives output signals from the microphone 12 at an input terminal 24 and output signals from the audio speaker 14 at an input 26 and responds to these output signals to provide a pause indicating signal on an output 28 during pauses in the speaking of the local user of the telephone 10.

The pause indicating signal is applied to a control input of the automatic muting circuit 16 which responds to the pause indicating signal to break the series circuit between the microphone 12 and a microphone input 30 of the hybrid interface 20. This break in the circuit prevents microphone output signals from being passed to the telephone line 22 by the hybrid interface 20 and thereby prevents the noise problem associated with noise resulting from acoustical feedback along an acoustical feedback path 31 from the audio speaker 14 to the microphone 12. The automatic muting circuit is a simple transistor switch, preferably an integrated circuit manufactured by National Semi Conductor MM 74H4316 or alternatively, a discrete design performing the same function, switches to an off, or nonconductive, state to mute the microphone 12 whenever the pause indicating signal at its input is in a binary logic 0-state, or low voltage state, to open the circuit between the microphone 12 and the hybrid interface input. So long as the pause indicating signal at the input to the automatic muting circuit 16 is in a low voltage 0-state the transistor switch of the automatic muting circuit remains off, but as soon as the pause indicating output signal of the pause detector 18 switches to a high voltage 1-state, then microphone 12 is unmuted by the automatic muting circuit 16 automatically switching to a conductive on-state to reconnect the microphone output signal at the input 15 with the input 30 of the hybrid interface 20 to enable transmission of the microphone output signal onto the telephone line 20.

Preferably, the pause indicating signal 0-state is generated in response to a difference between the amplified microphone signal and the amplified audio speaker signal decreasing beneath a first magnitude but remains in the 0-state until the difference rises to a second level greater than the first magnitude to provide sufficient hysterisis to prevent switch point oscillations.

The microphone, audio speaker and hybrid interface are conventional elements of known speaker telephones and the details concerning these elements forms no part of this invention.

The pause detector 18 includes a speech signal subtractor 32 with an output terminal connected directly with the output 28 of the pause detector 18 connected to the input of the automatic muting circuit 16 and two inputs 34 and 36. These inputs 34 and 36 are respectively coupled to the outputs of a microphone amplifier 38 with automatic gain control, or AGC, and a substantially identical speaker amplifier with automatic gain control, or AGC, 40. The amplifiers 38 and 40 have inputs respectively directly coupled to the microphone 12 and the audio speaker 14 through the input terminals 24 and 26 of the pause detector 18. The amplifiers 38 and 40 function to raise the levels, or magnitudes of the amplified output signals to substantially the same level to enable the subtractor 32 to compare the waveforms of the microphone output signals with the waveforms of the audio speaker output signals by subtracting the output signal from one of the amplifiers 38 and 40 from the output signal from the other one of the amplifiers 38 and 40. When the local user is not speaking, due to the acoustical feedback along the feedback path 31, the waveform of the audio speaker is substantially the same as waveform of the microphone. This is because the microphone 12 picks up the sound from the speaker 14 and converts the fed-back speech of the remote caller into electrical signals that conform in wave shape to the speaker signals from which they originate. Because the amplifiers 38 and 40 respectively amplify the signals by the necessary amounts needed to bring the magnitudes of both signals appearing at the inputs 34 and 36 of the subtractor to the same level, when there is a pause in the speaking of the local caller, the subtraction performed by the speech signal subtractor produces a substantial null result which is reflected in production of a 0-state of the subtractor output 28 to mute the microphone. A 0-state pause detection signal will, of course, also be produced when none of the remote callers are speaking because both input signals to the pause detector 18 will be substantially zero.

As soon as the local user speaks into the microphone 12 the waveform from the microphone 12 becomes different from the waveform from the audio speaker 14 because there is no immediate feedback from the microphone to the speaker. Consequently, as soon as the local user speaks into the microphone 12 the pause detector 18 senses the difference in the waveforms and switches the output signal at the output 28 from the muting 0-state to the non-commmuting 1-state to reconnect the output of the microphone 12 to the hybrid interface 20

The speech subtractor 18 is preferably a discrete op-amp design or a commercially available device familiar to those skilled in the art, although any speech subtractor 18 that performs the function of comparing speech waveforms by subtracting the signal waveforms from each other to determine if there is a zero result is suitable.

The amplifiers with automatic gain control 38 and 40 are preferably Liner Technologies Model LC403 amplifiers, but other automatic gain control amplifiers are also capable of being successfully employed.

If the subtraction of these signals yield a net zero result, then the speech subtractor 18 actuates the automatic muting circuit 16, which then mutes the microphone 12.

While the above embodiment has been disclosed in detail for the purposes of illustrating the invention, the scope of the invention is not limited to such details but rather is defined by the appended claims.

What is claimed is:

1. In a telephone having a microphone and an audio speaker, the improvement being an automatic muting circuit, comprising:

means for detecting pauses in speaking of a local user, in which the means for detecting pauses include a signal comparator to compare signals from the microphone and the audio speaker; and means responsive to the detecting means for automatically muting the microphone.

2. The telephone of claim 1 in which the means for automatically muting the microphone mutes the microphone in response to the detecting means detecting said speaking pauses only of the local user.

3. The telephone of claim 1 in which the speech comparator is connected to the automatic muting circuit to actuate the automatic muting circuit if the signals from the microphone and the audio speaker have substantially the same waveform.

4. The telephone of claim 1 in which the signal comparator is a speech subtractor that subtracts one of the signals from the microphone and the speaker from another of the signals from the microphone and the speaker, and the means for detecting pauses includes a pair of amplifiers with automatic gain control to respectively amplify the signals from the microphone and the audio speaker to substantially the same level prior to subtraction by the speech subtractor.

5. The telephone of claim 4 in which the speech subtractor includes means for generating a pause indicating signal in response to a difference between the amplified microphone signal and the amplified audio speaker signal decreasing beneath a first magnitude and until the difference rises to a second level greater than the first magnitude.

6. The telephone of claim 5 in which the muting means mutes the microphone so long as the pause indicating signal is present.

7. The telephone of claim 1 including a hybrid interface for interfacing both the microphone and the speaker to a telephone line for simultaneous two-way communication.

8. The telephone of claim 1 in which the automatically muting means opens the microphone for transmission of microphonic output signals whenever a local user speaks into the microphone.

9. In a telephone having a microphone and an audio speaker, the improvement being an automatic muting method, comprising the steps of:

detecting pauses in speaking of a local user;

comparing waveforms of the signals from the microphone and from the audio speaker; and responding to the detection of the speaking pauses by automatically muting the microphone.

10. The method of claim 9 in which the step of responding to the detection of pauses includes the step of muting the microphone when the speaking pauses are detected of only the local user.

11. The method of claim 9 in which the step of detecting pauses includes the step of determining if the waveforms from the microphone and the audio speaker are substantially the same.

12. The method of claim 9 in which the step of comparing includes the steps of subtracting one of the signals from one of the microphone and the speaker from another of the signals from the microphone and the speaker, and amplifying the signals from the microphone and the speaker with a pair of amplifiers with automatic gain control to respectively amplify the signals from the microphone and the audio speaker to substantially the same level prior to subtraction.

13. The method of claim 12 in which the step of automatically muting includes the step of generating a pause indicating signal in response to a difference between the amplified microphone signal and the amplified audio speaker signal decreasing beneath a first magnitude and until the difference rises to a second level greater than the first magnitude.

14. The method of claim 13 in which the step of automatically muting includes the step of the automatically muting the microphone so long as the pause indicating signal is present.

15. The method of claim 9 including the step of interfacing both the microphone and the speaker to a telephone line for simultaneous two-way communication when there are no pauses.

16. The method of claim 9 in which the step of automatically muting includes the step of automatically opening the microphone for transmission of microphonic output signals whenever a local user speaks into the microphone.

17. The method of claim 9 including the step of automatically opening the microphone for transmission of microphonic output signals whenever a local user speaks into the microphone.

* * * * *